July 17, 1962  H. DE L. McKINLAY, JR  3,045,124
LIGHT RESPONSIVE MEANS
Filed Feb. 21, 1958  2 Sheets-Sheet 1
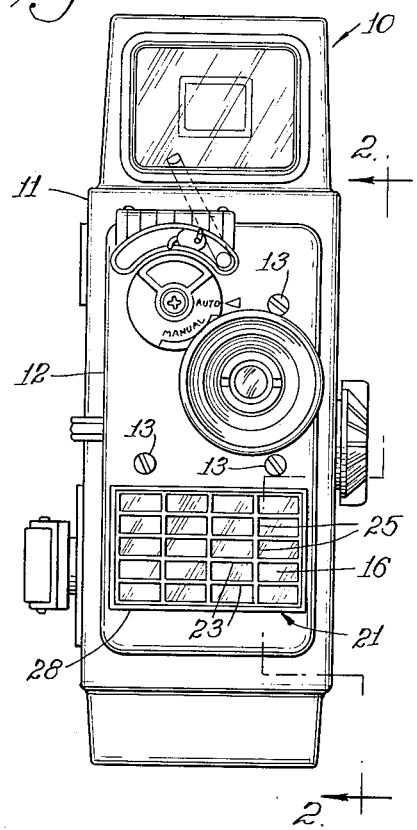
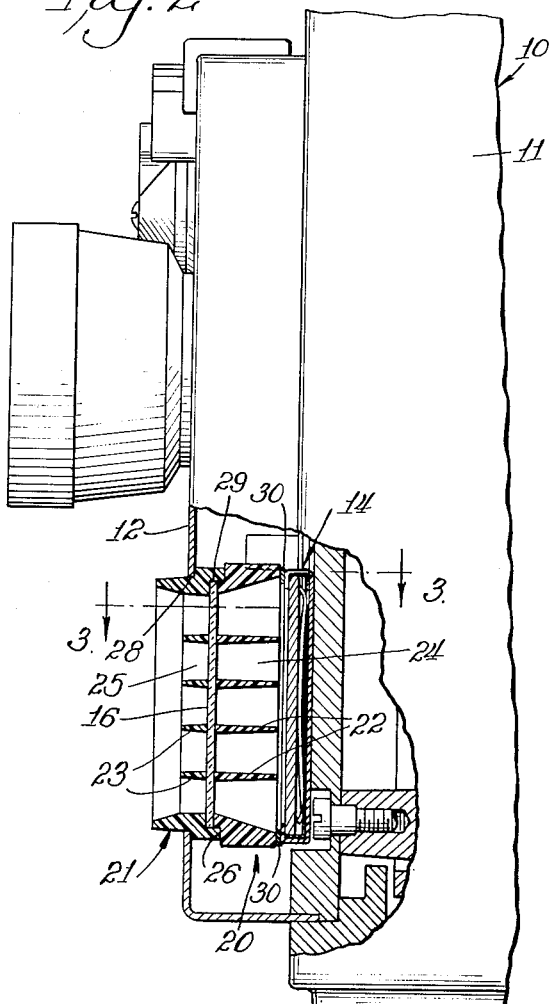
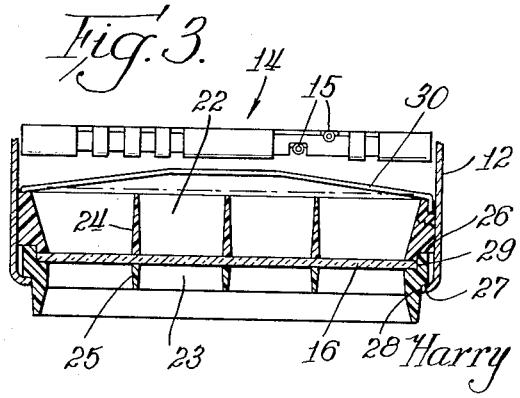
Inventor
Harry deL. McKinlay, Jr.
By Robert W. Miehle, Att'y.

July 17, 1962 H. DE L. McKINLAY, JR 3,045,124
LIGHT RESPONSIVE MEANS
Filed Feb. 21, 1958 2 Sheets-Sheet 2

Inventor
Harry deL. McKinlay, Jr.
By
Atty.

United States Patent Office 3,045,124
Patented July 17, 1962

3,045,124
LIGHT RESPONSIVE MEANS
Harry de L. McKinlay, Jr., Glenview, Ill., assignor to Bell & Howell Company, Chicago, Ill., a corporation of Illinois
Filed Feb. 21, 1958, Ser. No. 716,695
3 Claims. (Cl. 250—226)

This invention relates, generally, to light responsive means and it has particular relation to means for controlling the light impinging on a photoelectric cell from different sources of light and it constitutes an improvement over the invention of copending application Serial No. 677,865, filed August 13, 1957, now Patent No. 2,841,064, issued July 1, 1958, and assigned to the assignee of this application.

In the use of a photographic camera provided with a photoelectric exposure control, it is desirable that the exposure control function properly with a daylight type of color film and also with an artificial or tungsten light type of color film having a higher emulsion speed than the daylight type. Examples of such film are "Kodachrome" daylight type for daylight exposure and having an emulsion speed rating of ASA 10 and "Kodachrome" type A for artificial or tungsten light exposure and having an emulsion speed rating of ASA 16.

Noting that the diaphragm opening of the photographic lens of a photoelectric exposure control is varied inversely with respect to variance of light to which the photoelectric cell of the control is subjected, it is the present practice to provide an adjustable shutter which, in one position, cuts off light from a predetermined portion of the light receiving area of the photoelectric cell in order to provide proper functioning of the exposure control for the daylight type of film and which, in another position, permits a greater predetermined portion of the light receiving area of the photoelectric cell to receive light and provide proper functioning of the exposure control for the artificial or tungsten light type of film. While such a shutter is effective, it requires manual adjustment and, through inadvertence, may be positioned improperly for the type of film being exposed.

It is one of the objects of the invention to provide means whereby a photoelectric control is automatically accommodated for proper exposure of these different types of film without requiring any mechanical adjustment whatsoever.

Other objects of this invention include: Transmitting to the photoelectric cell only that portion of the light spectrum that is common to daylight and the artificial light impinging on the photocell; to prevent transmission of that portion of the spectrum of daylight that is absent in tungsten light; transmitting to the photoelectric cell about the same amount of energy from either daylight or tungsten light under comparable conditions; applying to the photoelectric cell light having wave lengths above a predetermined minimum wave length, such as 560 millimicrons; to limit the light impinging on the photoelectric cell substantially to that which is normal thereto; and to provide horizontal and vertical grid elements on opposite sides of the filter in order to thus limit the light.

Other objects of this invention will, in part, be obvious and in part appear hereinafter.

This invention is disclosed in the embodiment thereof shown in the accompanying drawings and it comprises the features of construction, combination of elements and arrangement of parts that will be exemplified in the construction hereinafter set forth and the scope of the application of which will be indicated in the appended claims.

For a more complete understanding of the nature and scope of this invention reference can be had to the following detailed description, taken together with the accompanying drawings, in which:

FIGURE 1 is a view, in front elevation and at full size, of an eight millimeter camera in which the present invention is embodied;

FIGURE 2 is a view, at an enlarged scale, taken generally along the line 2—2 of FIGURE 1;

FIGURE 3 is a horizontal sectional view taken generally along the line 3—3 of FIGURE 2, the photoelectric cell being shown in spaced relation to the back grid to illustrate the manner in which it is assembled in the case;

Figure 5:
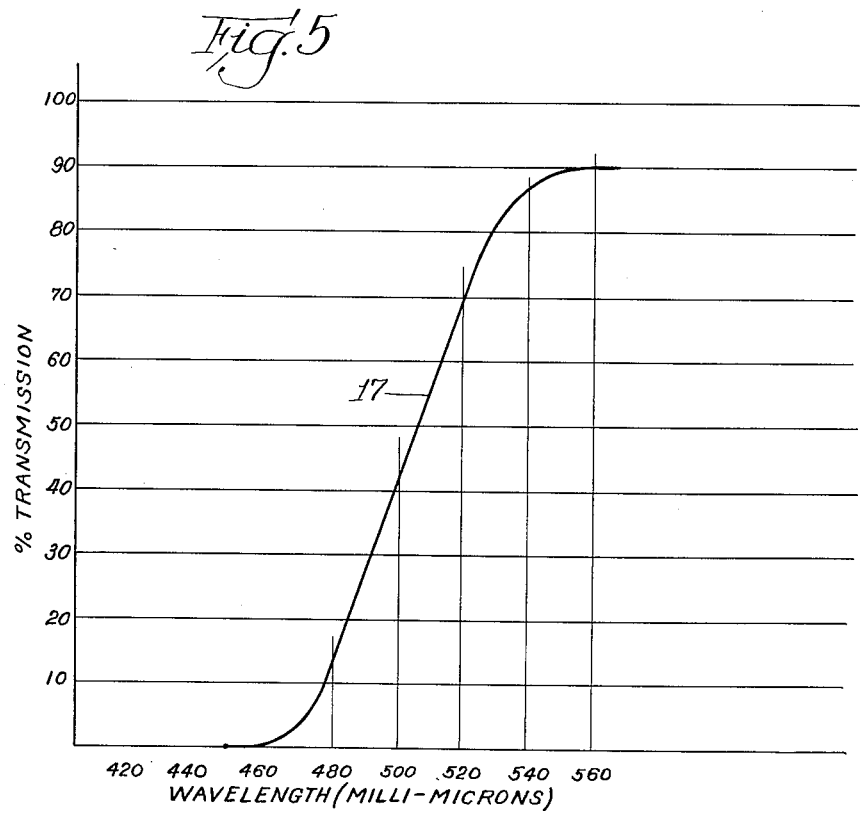
FIGURE 5 is a curve which demonstrates certain characteristics of the filter.

Referring now particularly to FIGURES 1, 2 and 3 of the drawings, it will be observed that the reference character 10 designates, generally, a photographic movie camera of the type described in more detail in the application referred to hereinbefore. The camera 10 includes a camera housing and on the front side thereof a case 12 is located and held in position by screws 13. Within the case 12, as shown in FIGURES 2 and 3, there is a photoelectric cell that is shown, generally, at 14 and is preferably of rectangular configuration.

Figure 4:
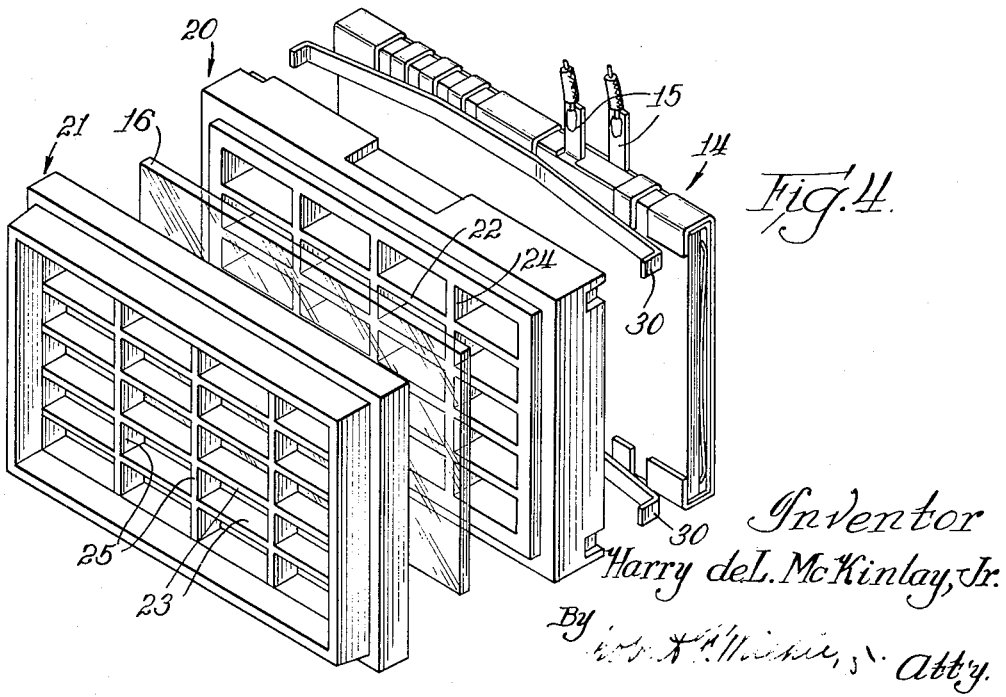
FIGURE 4 is a perspective view, at double scale, showing the relationship between the photoelectric cell, light filter therefor and the back and front grids located on opposite sides of the filter.

As shown in FIGURE 4, the photoelectric cell 14 is provided with terminals 15 which are connected, as described in the application above mentioned, to the winding of a galvonometer type mechanism which is arranged to control mechanically the diaphragm opening in accordance with the light energy received by the photoelectric cell 14.

It is desirable to provide for using the camera 10 either in daylight or in artificial light such as tungsten light. It was pointed out above wherein different film speeds are used for these different conditions and that the difference in conditions was accommodated by employing an adjustable shutter to vary the light energy impinging on the photoelectric cell 14. Since this required the operator to make an adjustment and such adjustment may be made improperly or forgotten altogether, it is desirable to provide other means to accomplish the same result.

For this purpose a filter 16, generally rectangular in shape to conform to the shape of the photoelectric cell 14, is employed. It is interposed between the light sensitive portion of the photoelectric cell 14 and the light which is reflected from the object being photographed. The filter 16 is chosen so that it will remove from daylight that portion of the spectrum which is absent in tungsten light. The curve 17, shown in FIGURE 5, illustrates a preferred light transmission characteristic for the filter 16. Here percent of transmission is plotted as ordinates against wave lengths in milli-microns as abscissae. The filter 16, barring overall absorption, obstructs transmission only of the shorter wave lengths, as shown in FIGURE 5, which are lacking or present in only negligible amounts in tungsten light but which constitute a considerable portion of daylight. Thus, the filter 16 reduces the energization of the photoelectric cell 14 as it is exposed to daylight so that the same area of the photoelectric cell 14 may be exposed to daylight as with artificial light while providing the relatively large diaphragm opening that is required by the slow emulsion speed of daylight color film. By employing the filter 16 having the light transmitting characteristics as described, it is unnecessary to employ a shutter for mechanically reducing the exposed area of the photoelectric cell 14 for daylight film.

The manner in which the filter 16 is mounted in the case 12 is important. In FIGURES 2, 3 and 4 it will be observed that it is located between a back grid, shown generally at 20, and a front grid, shown generally at 21. These grids are formed of molded plastic material and are generally rectangular to conform to the rectangular shapes of the photoelectric cell 14 and filter 16. It is desirable that only light normal to the photoelectric cell 14 be permitted to impinge thereon. In order to limit the amount of light impinging on the photoelectric cell 14 from above or below it, horizontal grid elements 22 and 23 are formed integrally with the back and front grids 20 and 21 respectively. Light from the sides is prevented from impinging on the photoelectric cell 14 by vertical grid elements 24 and 25 which likewise are formed integrally with the back and front grids 20 and 21 respectively.

As shown in FIGURES 2 and 3 of the drawings the back grid 20 is shouldered at 26 into the front grid 21 while the latter is shouldered at 27 into a generally rectangular opening 28 that is provided in the case 12. Between the back and front grids 20 and 21 a groove 29 is formed for receiving the filter 16. The assembled back and front grids 20 and 21 with the filter 16 therebetween are resiliently held in position by leaf springs 30. As shown in FIGURE 2 a compact arrangement is provided when the assembly is complete in the case 12 with the photoelectric cell 14 juxtaposed to the rear portion of the back grid 20 while the filter 16 is interposed between the back and front grids 20 and 21 and the latter is located in the opening 28 and projects therethrough.

When the camera 10 is used either in daylight or in tungsten light no adjustment is required insofar as the energization of the photoelectric cell 14 is concerned to accommodate these different conditions. By employing the filter 16, which preferably approximates a Wratten No. 8 filter, the portion of the spectrum of light which is absent in tungsten light is filtered out of daylight and thus the photoelectric cell 14 is subjected to the same light energy under comparable conditions. The filter 16 preferably is formed of a suitable plastic, such as methyl methacrylate resin which is provided with the proper color to give the desired operating charactertistics.

Since certain changes can be made in the foregoing construction and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. In a camera including variable exposure control means, galvanometer means for controlling the variable exposure control means, and photocell means sensitive to substantially the entire daylight spectrum for regulating the galvanometer means, the improvement for regulating the photocell means to adapt the photocell means automatically to both outdoor film having a first predetermined film speed and indoor film having a second predetermined film speed higher than said first predetermined film speed and comprising a filter adapted to transmit to the photocell means all portions of the visible spectrum below about five-hundred-sixty milli-microns so that the lower portions of daylight spectrum are absorbed and substantially all portions of tungsten spectrum are transmitted to the photocell means.

2. In a camera including variable diaphragm means, galvanometer means for driving the diaphragm means, and photocell means sensitive to substantially the entire daylight spectrum for regulating the galvanometer means, the improvement for regulating the photocell means to adapt the photocell means automatically to both outdoor film having a first predetermined film speed and indoor film having a second predetermined film speed higher than said first predetermined film speed and comprising a filter adapted to transmit to the photocell means all portions of the visible spectrum below about five-hundred-sixty milli-microns so that the lower portions of daylight spectrum are absorbed and substantially all portions of tungsten spectrum are transmitted to the photocell means.

3. In a camera including an adjustable diaphragm, electromotive means for adjusting the diaphragm, a photoelectric cell for controlling the electromotive means and subject to light from a scene to be photographed, the combination therewith of a filter interposed between the cell and the scene to be photographed and adapted to transmit to the cell substantially all portions of the visible spectrum above about five-hundred-sixty milli-microns and to absorb substantially all portions of the visible spectrum below about five-hundred-sixty milli-microns so that the lower portions of daylight spectrum are absorbed and substantially all portions of the tungsten spectrum are transmitted to the photoelectric cell, whereby the camera is adapted to use both indoor and outdoor type films.

References Cited in the file of this patent
UNITED STATES PATENTS

| | | |
|---|---|---|
| 1,458,165 | Coblentz | June 12, 1923 |
| 1,974,433 | Riszdorfer | Sept. 25, 1934 |
| 2,222,788 | Touceda et al. | Nov. 26, 1940 |
| 2,227,166 | Tonnies | Dec. 31, 1940 |
| 2,330,877 | Fleisher et al. | Oct. 5, 1943 |
| 2,550,610 | Smith et al. | Apr. 24, 1951 |
| 2,598,783 | Gittus | June 3, 1952 |
| 2,694,956 | Rebikoff | Nov. 23, 1954 |
| 2,728,265 | Stimson et al. | Dec. 27, 1955 |
| 2,744,200 | Taylor | May 1, 1956 |
| 2,841,064 | Bagby et al. | July 1, 1958 |
| 2,884,564 | McIlvaine | Apr. 28, 1959 |